(12) United States Patent  
Chiba et al.

(10) Patent No.: US 11,964,544 B2
(45) Date of Patent: Apr. 23, 2024

(54) AUTOMOBILE LAMINATED GLASS

(71) Applicant: Nippon Sheet Glass Company, Limited, Tokyo (JP)

(72) Inventors: Kazuki Chiba, Tokyo (JP); Ryohei Ogawa, Tokyo (JP); Hisashi Ogawa, Tokyo (JP); Hisashi Asaoka, Tokyo (JP)

(73) Assignee: NIPPON SHEET GLASS COMPANY, LIMITED, Tokyo (JP)

( * ) Notice: Subject to any disclaimer, the term of this patent is extended or adjusted under 35 U.S.C. 154(b) by 181 days.

(21) Appl. No.: 17/311,230

(22) PCT Filed: Dec. 5, 2019

(86) PCT No.: PCT/JP2019/047705
§ 371 (c)(1),
(2) Date: Aug. 6, 2021

(87) PCT Pub. No.: WO2020/116586
PCT Pub. Date: Jun. 11, 2020

(65) Prior Publication Data
US 2022/0024282 A1 Jan. 27, 2022

(30) Foreign Application Priority Data
Dec. 5, 2018 (JP) .................... 2018-228526

(51) Int. Cl.
*B32B 7/12* (2006.01)
*B32B 17/10* (2006.01)
(Continued)

(52) U.S. Cl.
CPC .......... *B60J 1/001* (2013.01); *B32B 17/10036* (2013.01); *B32B 17/10348* (2013.01);
(Continued)

(58) Field of Classification Search
CPC ............... B32B 7/12; B32B 17/10036; B32B 17/10761; B60K 2370/1529; B60K 2370/785
See application file for complete search history.

(56) References Cited

U.S. PATENT DOCUMENTS 6,352,754 B1  3/2002  Frost et al.
6,410,120 B1  6/2002  Frost et al.
(Continued)

FOREIGN PATENT DOCUMENTS

CN  103533686 A  1/2014
CN  103608173 A  2/2014
(Continued)

OTHER PUBLICATIONS

International Search Report for PCT/JP2019/047705 dated Feb. 25, 2020.
(Continued)

*Primary Examiner* — Elizabeth E Mulvaney
(74) *Attorney, Agent, or Firm* — Birch, Stewart, Kolasch & Birch, LLP

(57) ABSTRACT

A automobile laminated glass according to the present invention includes: a first glass plate that is formed into a rectangular shape; a second glass plate that is disposed so as to face the first glass plate, and is formed into a rectangular shape; an intermediate film that is disposed between the first glass plate and the second glass plate; a functional layer that is disposed between the first glass plate and the second glass plate; and an obstructing layer that is laminated on a peripheral edge portion of at least one of the first glass plate and the second glass plate, wherein the functional layer is formed so that an outer edge of at least a portion of the functional layer is located outward of an inner edge of the obstructing layer.

19 Claims, 6 Drawing Sheets

(51) Int. Cl.
  *B60J 1/00*      (2006.01)
  *B60K 35/00*     (2006.01)
(52) U.S. Cl.
  CPC .. *B32B 17/10431* (2013.01); *B32B 17/10761* (2013.01); *B32B 17/10788* (2013.01); *B60J 1/002* (2013.01); *B60K 35/00* (2013.01); *B32B 2250/05* (2013.01); *B32B 2250/40* (2013.01); *B32B 2605/006* (2013.01); *B60K 2370/1529* (2019.05); *B60K 2370/785* (2019.05)

(56) References Cited

U.S. PATENT DOCUMENTS

| | | | |
|---|---|---|---|
| 6,495,261 | B1 | 12/2002 | Gagliardi et al. |
| 2003/0111160 | A1 | 6/2003 | Bolognese et al. |
| 2005/0142332 | A1 | 6/2005 | Sauer |
| 2010/0314900 | A1 | 12/2010 | Labrot et al. |
| 2014/0127485 | A1 | 5/2014 | Uto et al. |
| 2015/0101736 | A1 | 4/2015 | Izutani et al. |
| 2017/0242247 | A1 | 8/2017 | Tso et al. |
| 2017/0305240 | A1 | 10/2017 | Aoki et al. |
| 2018/0017789 | A1 | 1/2018 | Aoki et al. |
| 2018/0149865 | A1 | 5/2018 | Arndt et al. |
| 2018/0215240 | A1* | 8/2018 | Irie ............... B32B 17/1044 |
| 2018/0272660 | A1 | 9/2018 | Aoki |
| 2018/0272661 | A1 | 9/2018 | Nishino et al. |
| 2018/0281352 | A1 | 10/2018 | Aoki |
| 2019/0275275 | A1* | 9/2019 | Brown ............... B01J 20/262 |
| 2019/0337270 | A1 | 11/2019 | Sadakane et al. |
| 2020/0299497 | A1 | 9/2020 | Yoshida et al. |
| 2021/0122144 | A1* | 4/2021 | Sadakane ............ B32B 3/263 |

FOREIGN PATENT DOCUMENTS

| | | |
|---|---|---|
| CN | 105739098 A | 7/2016 |
| CN | 105842850 A | 8/2016 |
| CN | 106489096 A | 3/2017 |
| CN | 108884326 A | 11/2018 |
| DE | 698 19 616 T2 | 9/2004 |
| EP | 0997266 A1 | 5/2000 |
| EP | 3 269 547 A1 | 1/2018 |
| JP | 2000-247691 A | 9/2000 |
| JP | 2002-103455 A | 4/2002 |
| JP | 2011-114404 A | 6/2011 |
| JP | 2013-86987 A | 5/2013 |
| JP | 2015-24930 A | 2/2015 |
| JP | 2016-64965 A | 4/2016 |
| JP | 2016-97781 A | 5/2016 |
| JP | 2017-81775 A | 5/2017 |
| JP | 2017-96986 A | 6/2017 |
| JP | 2017-206012 A | 11/2017 |
| JP | 2018-145067 A | 9/2018 |
| JP | 2018-158883 A | 10/2018 |
| JP | 2019-172512 A | 10/2019 |
| JP | 2019-196299 A | 11/2019 |
| WO | WO 01/51279 A2 | 7/2001 |
| WO | WO 2010/093023 A1 | 8/2010 |
| WO | WO 2015/146676 A1 | 10/2015 |
| WO | WO 2015/170771 A1 | 11/2015 |

OTHER PUBLICATIONS

Written Opinion of the International Searching Authority for PCT/JP2019/047705 dated Feb. 25, 2020.
Chinese Office Action and Search Report for corresponding Chinese Application No. 201980080628.8, dated Aug. 15, 2022, with English translation.
Extended European Search Report for European Application No. 19892746.9, dated Jul. 19, 2022.
Japanese Office Action for Japanese Application No. 2020-560027, dated Jan. 9, 2024, with English translation.

* cited by examiner

AUTOMOBILE LAMINATED GLASS

TECHNICAL FIELD

The present invention relates to an automobile laminated glass.

BACKGROUND ART

An automobile laminated glass used in a windshield includes an outer glass plate, an inner glass plate, and an intermediate film disposed between these glass plates. In recent years, the intermediate film is provided with various additional functions. For example, a functional layer such as a heat shield film is provided in the intermediate film in order to suppress a temperature rise caused by light from the outside of a vehicle (for example, Patent Literature 1).

CITATION LIST

Patent Literature

Patent Literature 1: JP 2016-64965A

SUMMARY OF INVENTION

Technical Problem

The above-described laminated glass is formed into a curved shape so as to protrude toward the outside of the vehicle. More specifically, for example, many windshields have a three-dimensional structure that curves with respect to an axis that extends in a horizontal direction, and further curves with respective to an axis that extends in a vertical direction. Therefore, if the functional layer, which is a flat film, is sandwiched between the two glass plates, the functional layer may be wrinkled, and causes a problem in that the appearance of the laminated glass degrades.

The present invention has been made in view of the above-described problem, and aims to provide an automobile laminated glass with which the appearance thereof is prevented from being degraded by wrinkles formed in a functional layer in an intermediate film disposed between two curved glass plates.

Solution to Problem

Item 1. An automobile laminated glass including:
a first glass plate that is formed into a rectangular shape;
a second glass plate that is disposed so as to face the first glass plate, and is formed into a rectangular shape;
an intermediate film that is disposed between the first glass plate and the second glass plate, and includes a functional layer; and
an obstructing layer that is laminated on a peripheral edge portion of at least one of the first glass plate and the second glass plate,
wherein the functional layer is formed so that an outer edge of at least a portion of the functional layer is located outward of an inner edge of the obstructing layer.

Item 2. The automobile laminated glass according to Item 1,
wherein the outer edge of at least a portion of the functional layer is an upper side of the automobile laminated glass.

Item. 3 The automobile laminated glass according to Item 1 or 2,
wherein a portion located outward of the inner edge of the obstructing layer, of the outer edge of the functional layer, is formed so as to have an arc-shaped corner.

Item 4. The automobile laminated glass according to any one of Items 1 to 3,
wherein the functional layer includes a projection film for a head-up display device, and at least one base film that supports the projection film, and
a portion of the outer edge of the functional layer is formed so as to reach an end edge of the automobile laminated glass.

Item 5. The automobile laminated glass according to any one of Items 1 to 3,
wherein the functional layer includes a projection film for a head-up display device, and at least one base film that supports the projection film, and
a portion of the outer edge of the functional layer is disposed with a gap from an end edge of the automobile laminated glass.

Item 6. The automobile laminated glass according to any one of Items 1 to 3,
wherein the functional layer includes a projection film for a head-up display device, and at least one base film that supports the projection film, and
an end edge of the projection film is located inward of an end edge of the base film, with a gap of at least 10 mm from the end edge of the base film.

Item 7. The automobile laminated glass according to any one of Items 1 to 3,
wherein the second glass plate is located on a vehicle interior-side,
the functional layer includes a projection film and at least one base film that supports the projection film, and
when a distance between the base film and the second glass plate is no greater than 50 µm, an end edge of the projection film is located inward of an end edge of the base film, with a gap of at least 26.8 mm from the end edge of the base film.

Item 8. The automobile laminated glass according to any one of Items 1 to 3,
wherein the second glass plate is located on a vehicle interior-side,
the functional layer includes a projection film for a head-up display device, and
a visible light transmittance of the second glass plate is greater than a visible light transmittance of the first glass plate.

Item 9. The automobile laminated glass according to Item 8,
wherein a thickness of the second glass plate is greater than a thickness of the first glass plate.

Item 10. The automobile laminated glass according to Item 8 or 9,
wherein a visible light transmittance per unit thickness of the second glass plate is greater than a visible light transmittance per unit thickness of the first glass plate.

Item 11. The automobile laminated glass according to any one of Items 8 to 10,
wherein the visible light transmittance of the second glass plate is no less than 85%.

Item 12. The automobile laminated glass according to any one of Items 1 to 3, wherein the second glass plate is located on a vehicle interior-side,
the functional layer includes a projection film for a head-up display device, and a distance between the projection film and the second glass plate is smaller than a distance between the projection film and the first glass plate.

Item 13. The automobile laminated glass according to Item 12,
wherein the distance between the projection film and the second glass plate is within a range of 0.3 μm to 100 μm.

Item 14. The automobile laminated glass according to Item 13,
wherein the distance between the projection film and the second glass plate is within a range of 20 μm to 100 μm.

Item 15. The automobile laminated glass according to any one of Items 1 to 3,
wherein the obstructing layer is provided with an opening through which light entering an information acquisition device that is provided on a vehicle interior-side passes, and
a distance between the opening and the functional layer is no less than 10 mm.

Item 16. The automobile laminated glass according to Item 15,
wherein a distance between the functional layer and either one of the glass plates is no greater than 50 μm, and
a distance between the opening and the functional layer is no less than 26.8 mm.

Item 17. The automobile laminated glass according to Item 15 or 16,
wherein the functional layer is provided with an optical film, and
an upper edge of the optical film is located lower than the opening.

Item 18. The automobile laminated glass according to any one of Items 1 to 3,
wherein the functional layer is provided with an infrared reflective film, and
a distance between the infrared reflective film and the first glass plate is smaller than a distance between the infrared reflective film and the first glass plate.

Item 19. The automobile laminated glass according to Item 18,
wherein the intermediate film includes a heat-shielding PVB film.

Item 20. The automobile laminated glass according to any one of Items 1 to 19,
wherein a thickness of the intermediate film is within a range of 0.3 μm to 400 μm.

Item 21. The automobile laminated glass according to Item 1,
wherein the intermediate film is provided with
the functional layer, and
at least one adhesion layer for bonding the functional layer to at least one of the glass plates.

Item 22. The automobile laminated glass according to Item 21,
wherein the at least one adhesion layer of the intermediate film is provided as a pair of adhesion layers, and
the functional layer is disposed between the pair of adhesion layers.

Item 23. The automobile laminated glass according to Item 1, 21, or 22,
wherein the functional layer is formed so that an outer edge of at least a portion of the functional layer is located within a range of 10 mm inward of an outer edge of the automobile laminated glass.

Item 24. The automobile laminated glass according to any one of Items 1 and 21 to 23,
wherein the automobile laminated glass is curved so as to protrude toward the first glass plate side, and a maximum distance between a virtual line connecting respective midpoints of upper and lower sides of the second glass plate and the second glass plate is no less than 10 mm.

Item 25. The automobile laminated glass according to any one of Items 1 and 21 to 24,
wherein a thickness of the outer edge of the functional layer is no greater than 2 mm.

Item 26. The automobile laminated glass according to any one of Items 1 and 21 to 25,
wherein the functional layer is configured to thermally shrink when heated at 130° C. for 30 minutes.

Item 27. The automobile laminated glass according to any one of Items 1 and 21 to 26,
wherein the automobile laminated glass is curved so as to protrude toward the first glass plate side, and
at least one of Formulas (1) and (2) below is satisfied:

$$r_V \times r_H \geq r_{MD} \times r_{TD} \quad (1)$$

$$r_V \geq 0.9990 \text{ and } r_V \geq r_{TD} \quad (2)$$

where
O denotes a midpoint of an upper side of the second glass plate,
P denotes a midpoint of a lower side of the second glass plate,
Q denotes a midpoint of a left side of the second glass plate,
R denotes a midpoint of a right side of the second glass plate,
$L_V$ denotes a length of a curved line OP that extends along a first surface of the second glass plate on an opposite side of the first glass plate,
$I_V$ denotes a length of a straight line OP,
Lh denotes a length of a curved line QR extending along the first surface of the second glass plate,
$I_H$ denotes a length of a straight line QR,
rV denotes $I_V/L_V$,
$r_H$ denotes $I_H/L_H$,
an MD direction denotes a roll winding direction in which the functional layer is fed out,
a TD direction denotes a direction that is orthogonal to the roll winding direction in which the functional layer is fed out,
$r_{MD}$ denotes a heat shrinkage of the functional layer in the MD direction before and after being heated at 130° C. for 30 minutes,
rTD denote a heat shrinkage of the functional layer in the TD direction before and after being heated at 130° C. for 30 minutes, and
the MD direction of the functional layer coincides with a direction in which the curved line QR extends.

Item 28. The automobile laminated glass according to any one of Items 1 and 21 to 27,
wherein the first glass plate is located on a vehicle exterior-side,
the second glass plate is located on a vehicle interior-side, and
the obstructing layer is laminated on at least one of a vehicle interior-side surface of the first glass plate and a vehicle interior-side surface of the second glass plate.

Item 29. The automobile laminated glass according to any one of Items 1 and 21 to 28,
wherein an infrared transmittance of the obstructing layer is no greater than 5%.

Item 30. The automobile laminated glass according to any one of Items 1 and 21 to 29,
wherein the functional layer includes a heat shield film.

Item 31. The automobile laminated glass according to any one of Items 1 and 21 to 30,
wherein the functional layer includes at least one of a heating element or an antenna element.

Item 32. The automobile laminated glass according to any one of Items 1 and 21 to 31,
wherein the automobile laminated glass is configured so that light emitted from a head-up display device projects information thereto, and
the functional layer includes a projection film to which the information is projected.

Item 33. The automobile laminated glass according to Item 32,
wherein the projection film is larger than a display area to which the information is projected.

Item 34. The automobile laminated glass according to Item 32 or 33,
wherein a heat shrinkage of the projection film when heated at 130° C. for 30 minutes is no greater than 4%.

Advantageous Effects of Invention

According to the present invention, it is possible to prevent the appearance thereof from being degraded by wrinkles formed in a functional layer in an intermediate film disposed between two curved glass plates.

DESCRIPTION OF EMBODIMENTS

Figure 1:
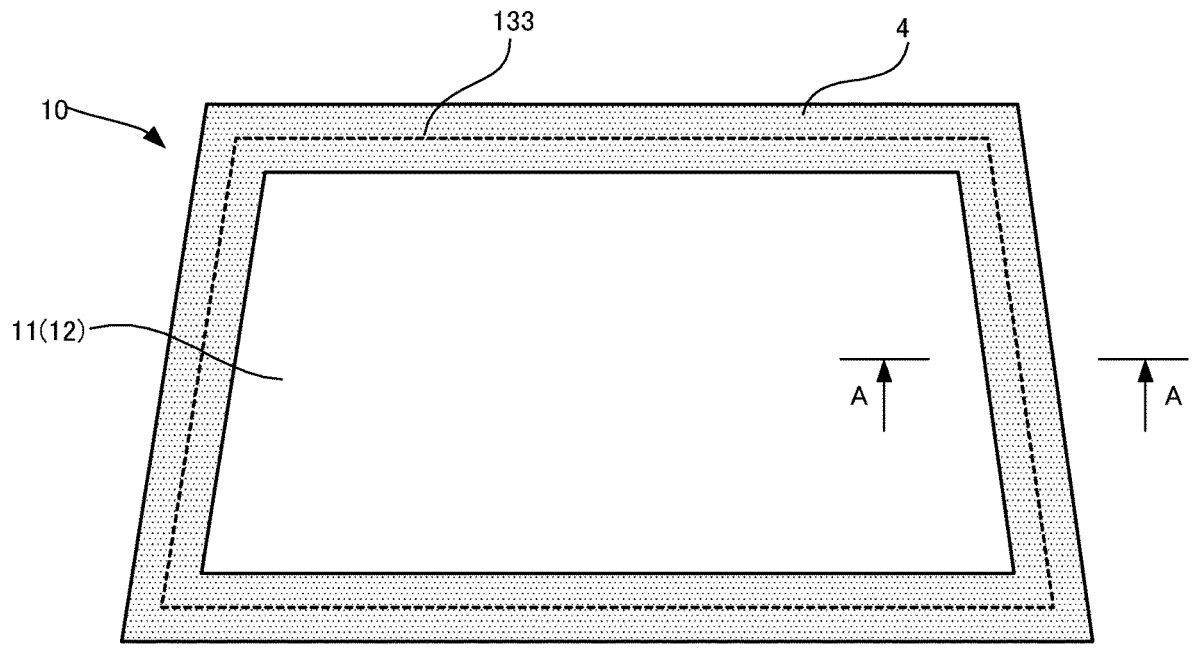
FIG. 1 is a plan view showing an embodiment in which an automobile laminated glass according to the present invention is applied to a windshield.
Figure 2:
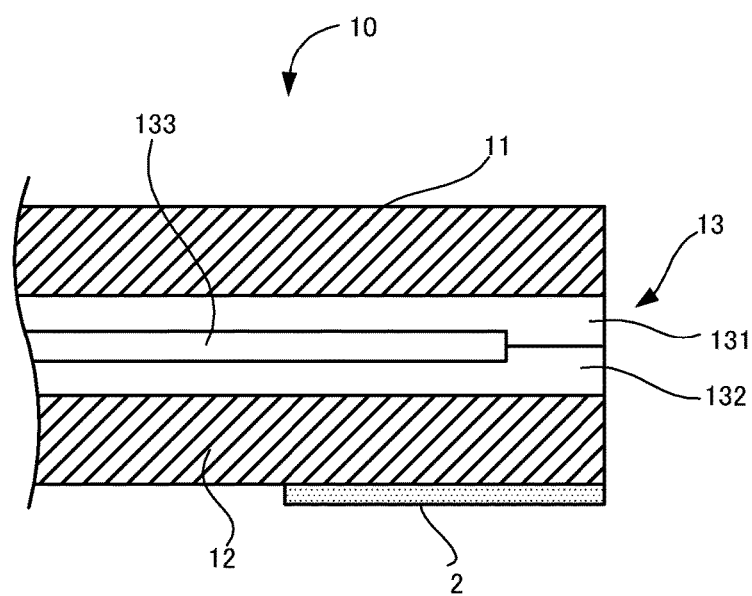
FIG. 2 is a cross-sectional view along a line A-A in FIG. 1.

First, a configuration of a windshield according to the present embodiment will be described with reference to FIGS. 1 and 2. FIG. 1 is a plan view of windshield according to the present embodiment, and FIG. 2 is a cross-sectional view of FIG. 1. For convenience of explanation, the vertical direction in FIG. 1 may be referred to as a "top-bottom", "vertical", or "longitudinal" direction, and the horizontal direction in FIG. 1 may be referred to as a "left-right" direction.

As shown in FIG. 1, the windshield is provided with a laminated glass 10 that has a trapezoidal shape that is elongated in the horizontal direction. This laminated glass 10 includes an outer glass plate 11, an inner glass plate 12, and an intermediate film 13 disposed therebetween. An obstructing layer 4 is laminated on a peripheral edge portion of the vehicle interior-side surface of the inner glass plate 12 so as to obstruct the field of view from the outside of the vehicle. The following describes each constituent elements in detail.

<1. Laminated Glass>
<1.1. Glass Plates>

First, the outer glass plate 11 and the inner glass plate 12 will be described. The glass plates 11 and 12 can be known glass plates, and can also be formed with heat absorbing glass, ordinary clear glass or green glass, or UV green glass. However, these glass plates 11 and 12 need to achieve visible light transmittance conforming to the safety standards in the country in which an automobile is used. For example, an adjustment can be made so that a required solar absorptivity is ensured in the outer glass plate 11, and the visible light transmittance satisfies the safety standards with the inner glass plate 12. Examples of clear glass, heat absorbing glass, and soda-lime glass are listed below.

Clear Glass
$SiO_2$: 70 to 73 mass %
$Al_2O_3$: 0.6 to 2.4 mass %
CaO: 7 to 12 mass %
MgO: 1.0 to 4.5 mass %
$R_2O$: 13 to 15 mass % (R denotes alkali metal)
Total iron oxide (T-$Fe_2O_3$) expressed in terms of $Fe_2O_3$: 0.08 to 0.14 mass %

Heat Absorbing Glass

The composition of heat absorbing glass can be, for example, a composition that is based on the composition of clear glass, where the proportion of total iron oxide (T-$Fe_2O_3$) expressed in terms of $Fe_2O_3$ is 0.4 to 1.3 mass %, the proportion of $CeO_2$ is 0 to 2 mass %, the proportion of $TiO_2$ is 0 to 0.5 mass %, and the skeletal component (primarily, $SiO_2$ and $Al_2O_3$) of glass is reduced by the increased amount of T-$Fe_2O_3$, $CeO_2$, and $TiO_2$.

Soda-Lime Glass
$SiO_2$: 65 to 80 mass %
$Al_2O_3$: 0 to 5 mass %
CaO: 5 to 15 mass %
MgO: 2 mass % or more
NaO: 10 to 18 mass %
$K_2O$: 0 to 5 mass %
MgO+CaO: 5 to 15 mass %
$Na_2O+K_2O$: 10 to 20 mass %
$SO_3$: 0.05 to 0.3 mass %
$B_2O_3$: 0 to 5 mass %
Total iron oxide (T-$Fe_2O_3$) expressed in terms of $Fe_2O_3$: 0.02 to 0.03 mass %

Although the thickness of the laminated glass 10 according to the present embodiment is not particularly limited, the total thickness of the outer glass plate 11 and the inner glass plate 12 is preferably 2.1 mm to 6 mm. From the viewpoint of weight reduction, the total thickness of the outer glass plate 11 and the inner glass plate 12 is preferably 2.4 mm to 3.8 mm, more preferably 2.6 mm to 3.4 mm, and particularly preferably 2.7 mm to 3.2 mm.

The outer glass plate 11 principally needs durability and shock resistance against an external obstacle. When used as an automobile windshield, the outer glass plate 11 needs shock resistance against a flying object, such as a small stone. Meanwhile, the larger the thickness is, the larger the weight is, which is not favorable. From this viewpoint, the thickness of the outer glass plate 11 preferably is 1.8 mm to 2.3 mm, and more preferably is 1.9 mm to 2.1 mm. The thickness to be employed can be determined in accordance with the usage of the glass.

The thickness of the inner glass plate 12 can be made equal to that of the outer glass plate 11, but can alternatively be made smaller than the thickness of the outer glass plate 11 for the reduction in the weight of the laminated glass 10, for example. Specifically, giving consideration to the glass strength, the thickness of the inner glass plate 12 is preferably 0.6 mm to 2.0 mm, more preferably 0.8 mm to 1.6 mm, and particularly preferably 1.0 mm to 1.4 mm. Furthermore, the thickness of the inner glass plate 12 is preferably 0.8 mm to 1.3 mm. The thickness of the inner glass plate 12 to be employed can also be determined in accordance with the usage of the glass.

In addition, the laminated glass 10 is curved so as to protrude toward the outside of the vehicle as described later in detail, and the thickness in such a case is measured at two positions, namely an upper position and a lower position on a center line (a curved line OP described below) that extends in the top-bottom direction passing through the center of the laminated glass 10 in the left-right direction. There is no particular restriction on the type of measurement instrument, but a thickness gauge, such as the SM-112 manufactured by Teclock Corporation for example, can be used. During measurement, the laminated glass 10 is arranged so that the curved face thereof is placed on a flat face, and measurement is performed while holding an end portion of the laminated glass 1 using the aforementioned thickness gauge.

<1-2. Intermediate Film>

As shown in FIG. 2, the intermediate film 13 includes a first adhesion layer 131 that is transparent and is bonded to the outer glass plate 11, a second adhesion layer 132 that is transparent and is bonded to the inner glass plate 12, and a functional layer 133 that is transparent and is disposed between the adhesion layers 131 and 132.

Although the first adhesion layer 131 and the second adhesion layer 132 are not particularly limited as long as they can be bonded to the glass plates 11 and 12, they may be formed of, for example, polyvinyl butyral resin (PVB), ethylene vinyl acetate (EVA), or the like. Generally, it is possible to control the hardness of a polyvinyl acetal resin by controlling (a) the degree of polymerization of polyvinyl alcohol that is a starting material, (b) the degree of acetalization, (c) the type of plasticizer, (d) the addition ratio of the plasticizer, and so on.

The surfaces of the first adhesion layer 131 and the second adhesion layer 132 before being bonded to the glass plates 11 and 12 may be embossed in order to easily push air out when the first adhesion layer 131 and the second adhesion layer 132 are bonded to the functional layer 133 or to the glass plates 11 and 12.

Although the thicknesses of the first adhesion layer 131 and the second adhesion layer 132 are not particularly limited, the thicknesses are preferably 20 μm to 2.0 mm, more preferably 20 μm to 1.0 mm, and particularly preferably 50 μm to 100 μm. Note that the thicknesses of the adhesion layers 131 and 132 may be the same or different. When the adhesion layers 131 and 132 are to be embossed, it is preferable to set the thickness to 20 μm or more as described above, considering the embossing depth. Also, instead of using a sheet-shaped adhesive layer, it is possible to form the adhesion layers 131 and 132 through coating. In such a case, it is possible to form a thin adhesion layer of 0.3 μm to 100 μm.

The total thickness of the adhesion layers 131 and 132 is preferably no less than 0.76 mm. This is to ensure the penetration resistance and the like of the windshield, specified in JIS R3211 and R3212, for example.

A film having various functions can be used as the functional layer 133 according to the purpose. For example, a known heat shield film, heat generating film, projection film, light emitting film, antenna film, or the like may be used.

In order to suppress a temperature rise in the vehicle, a known infrared reflective film that reflects infrared rays, or a film configured to absorb infrared rays may be adopted as the heat shield film. Such a heat shield film is preferably disposed on the outer glass plate 11 side in the thickness direction of the intermediate film 13. That is to say, the first adhesion layer 131 is to be thinner than the second adhesion layer 132. With such a configuration, the laminated glass can absorb infrared rays at a position farther from the vehicle interior. In order to achieve a heat shielding function, in addition to forming the functional layer 133 using a heat shield film, it is possible to form at least either the first adhesion layer 131 or the second adhesion layer 132 using a heat shielding PVB.

The heat generating film is used to remove fogging and to deice, and has a configuration in which a plurality of thin wires that generate heat upon a voltage being applied thereto are supported by a base film. The base film may be a transparent film, and the material thereof is not particularly limited. The base film may be formed of, for example, polyethylene terephthalate, polyethylene, polymethylmethacrylate, polyvinyl chloride, polyester, polyolefin, polycarbonate, polystyrene, polypropylene, nylon, or the like.

The projection film is a film to which information is projected by light emitted from a head-up display device (hereinafter referred to as an HUD). The projection film is not particularly limited as long as it is a film that reflects light and has a refractive index different from those of the adhesion layers 131 and 132. For example, a film that can control polarization, such as a p-polarized light reflection film, a hologram film, a scattering reflection system type transparent screen, a scattering transmission type transparent screen, a scattering reflection type dimming film, a scattering transmission type dimming film, or a high reflection film for an HUD may be used. Although the size of the projection film is not particularly limited, it is preferably larger than the area to which information is to be projected. The projection film may be supported by a base film. The base film may be the same as the aforementioned heat generating film. The projection film may have the same size as the base film, or smaller than the base film. If this is the case, it is preferable that the outer edge of the projection film is located inward of the outer edge of the base film.

Note that the base film may be disposed on either the outer glass plate-side surface or the inner glass plate-side surface of the projection film. Alternatively, the projection film may be sandwiched between two base films.

The light emitting film has a built-in LED or the like, and emits light to show predetermined characters, figures, and so on.

The antenna film is, as with the heat generating film, a film formed by disposing an FM, AM, DTV, or DAB antenna on the above-described base film, for example.

Note that the above-described films are examples of the functional layer 133, and the functional layer 133 is not limited to these examples.

Although not particularly limited, the thickness of the film constituting the functional layer 133 described above is preferably 0.01 mm to 2.0 mm, and more preferably 0.03 mm to 0.6 mm, for example. As described above, the upper limit of the thickness of the end face of a peripheral edge portion of the film is preferably 2.0 mm. When the thickness of the end face of the film is large, the functional layer 133 is smaller than the two adhesion layers 131 and 132, and therefore a step is formed in the interlayer film 13. Due to this step, when the intermediate film 13 is sandwiched between the two glass plates 11 and 12, air may be contained and bubbles may be formed.

In order to prevent wrinkles from being formed, it is preferable that the functional layer 133 appropriately shrinks when heated at the time of bonding. The heat shrinkage rate of the functional layer 133 is preferably small, and is preferably no greater than 4% when heated at 130° C. for 30 minutes, for example. In particular, when a projection film is used as the functional layer 133, the heat shrinkage is preferably no greater than 1% when heated at 130° C. for 30 minutes. This is because a heat shrinkage rate that is too large causes image distortion, for example. The heat shrinkage can be measured in the following manner. First, a film having the functional layer 133 is provided with marks at intervals of 500 mm, this film is placed on a substrate without being fixed thereto, and is held in an electric furnace kept at 130° C., for 30 minutes, and the distance between the marks is measured to calculate the heat shrinkage.

The heat shrinkage of the functional layer 133 described above is that before the windshield is manufactured. However even after the windshield is manufactured as described below, the functional layer 133 obtained by disassembling the windshield preferably shrinks under the above-described conditions.

Note that the thicknesses of the adhesion layers 131 and 132 and the functional layer 133 can be measured in the following manner, for example. First, the cross section of the windshield is magnified 175 times and displayed, using a microscope (for example, VH-5500 manufactured by KEYENCE). Thereafter, the thicknesses of the adhesion layers 131 and 132 and the functional layer 133 are visually specified, and are measured. At this time, in order to eliminate visual variations, the number of measurements is set to 5, and the average value is taken as the thicknesses of the adhesion layer 131 and 132 and the functional layer 133.

The adhesion layers 131 and 132 have the same size as the outer glass plate 11 and the inner glass plate 12, whereas the functional layer 133 has a smaller size than the adhesion layers 131 and 132. Specifically, the peripheral edge of the functional layer 133 is located inward of the peripheral edges of the glass plates 11 and 12. For example, the peripheral edge of the functional layer 133 is preferably located at a position that is 5 mm or more inward of the peripheral edges of the glass plates 11 and 12, and more preferably at a position that is 10 mm or more inward thereof. This is to prevent water from entering from the edge of the intermediate film 13 when wrinkles are formed at the edge of the functional layer 133 as described later.

<2. Obstructing Layer>

As shown in FIG. 1, the obstructing layer 4 of a dark-color ceramic such as a black ceramic is laminated on the periphery of the windshield. The obstructing layer 4 is used to obstruct the field of view from the inside or the outside of the vehicle, is laminated along the four sides of the windshield, and is configured to cover a peripheral edge portion of the functional layer 133. Therefore, as described below, the obstructing layer 4 can hide a peripheral edge portion of the functional layer 133, which is likely to have wrinkles, and hide this part so as to be invisible from the inside or the outside of the vehicle.

As described above, the obstructing layer 4 may be laminated on various modes. For example, in addition to being laminated only on the vehicle interior-side surface of the inner glass plate 12, the obstructing layer 4 may be laminated only on the inner surface of the outer glass plate 11, or on the inner surface of the outer glass plate 11 and the inner surface of the inner glass plate 12. In addition, the obstructing layer 4 may be formed of various materials. For example, the following compositions may be employed.

TABLE 1

|  |  | First and Second Colored Ceramic Paste |
| --- | --- | --- |
| Pigment *1 | mass % | 10 |
| Resin (Cellulosic Resin) | mass % | 10 |
| Organic Solvent (Pine Oil) | mass % | 10 |
| Glass Binder *2 | mass % | 70 |
| Viscosity | dPs | 150 |

*1, Main ingredients: copper oxide, chromium oxide, iron oxide, and manganese oxide
*2, Main ingredients: bismuth borosilicate, zinc borosilicate The ceramic can be formed by means of screen printing, but can also be manufactured by transferring a transfer film for firing onto a glass plate and firing this glass plate. In the case of employing screen printing, for example, the following conditions may be employed: polyester screen: 355 mesh, coat thickness: 20 μm, tension: 20 Nm, squeegee hardness: 80 degrees, attachment angle: 75°, and printing speed: 300 mm/s, and the ceramic can be formed after being dried in a drying oven at 150° C. for 10 minutes.

Note that the obstructing layer 4 can be formed not only by laminating a ceramic, but also by attaching an obstructing film that is made of a dark-color resin.

<3. Relationship between Curve of Glass Plates and Intermediate Film>

Figure 3:
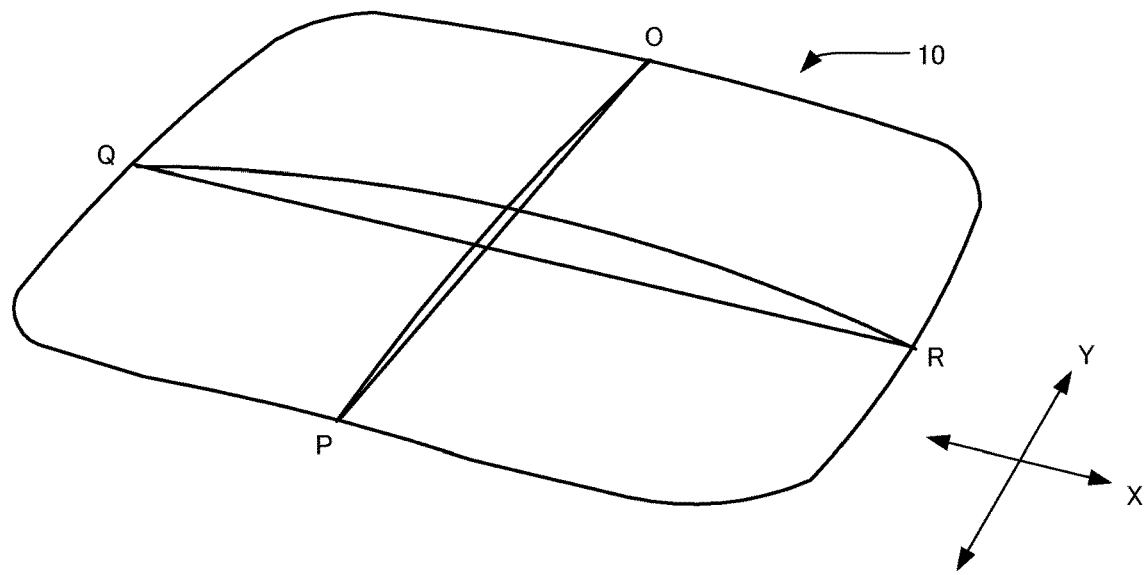
FIG. 3 is a perspective view of the windshield in FIG. 1.
Figure 4:
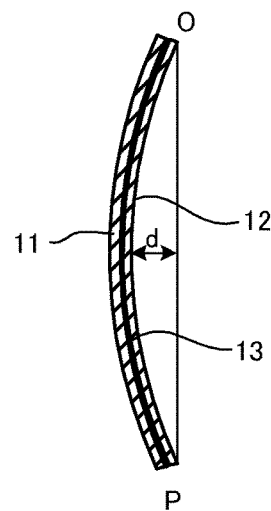
FIG. 4 is a cross-sectional view of the window shield in FIG. 3 taken along a Y direction.
Figure 5:
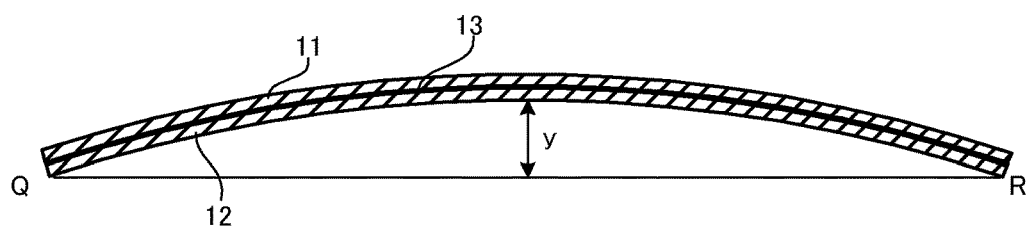
FIG. 5 is a cross-sectional view of the window shield in FIG. 3 taken along an X direction.

As described above, the windshield according to the present embodiment is curved so as to protrude toward the outside of the vehicle. Here, the relationship between the curve of the glass plates and the intermediate film will be examined. As shown in FIGS. 3 to 5, the dimensions and physical properties of the windshield are defined as follows. Note that FIG. 3 is a perspective view of the windshield according to the present embodiment, FIG. 4 is a cross-sectional view taken along the line OP in FIG. 3, and FIG. 5 is a cross-sectional view taken along a line QR in FIG. 3.

The midpoint of the upper side of the inner glass plate: O
The midpoint of the lower side of the inner glass plate: P
The midpoint of the left side of the inner glass plate: Q
The midpoint of the right side of the inner glass plate: R
The length of a curved line OP extending along the vehicle interior-side surface (a first surface) of the inner glass plate: $L_V$
The length of a straight line OP: $I_V$
The length of a curved line QR extending along the first surface of the inner glass plate: Lh
The length of a straight line QR: $I_H$
$I_V/L_V$: $r_V$
$I_H/L_H$: $r_H$
A roll winding direction in which the functional layer is fed out: an MD direction
A direction that is orthogonal to the roll winding direction in which the functional layer is fed out: a TD direction
The heat shrinkage of the functional layer in the MD direction before and after being heated at 130° C. for 30 minutes: $r_{MD}$ The heat shrinkage of the functional layer in the TD direction before and after being heated at 130° C. for 30 minutes: $r_{TD}$ As shown in FIG. 3, the windshield has a shape in which the line extending in the vertical direction (the Y axis) connecting the above-described points O and P is curved, and the line extending in the horizontal direction (the X axis) connecting the above-described points Q and R is curved. That is to say, this windshield has a three-dimensional structure. In the following description, the maximum distance between the straight line OP and the vehicle interior-side surface of the inner glass plate 12 is referred to as an amount of bend d, and the maximum distance between the straight line QR and the vehicle interior-side surface of the inner glass plate 12 is referred to as a bending depth y. In the windshield targeted by the present embodiment, the amount of bend d and the bending depth y, which indicate the degree of curvature, are both no less than 10 mm, and as a result, the functional layer 133 is likely to have wrinkles as described below.

By the way, as described below, the intermediate film 13 is disposed between the outer glass plate 11 and the inner glass plate 121, and is fixed between the two glass plates 11 and 12 after heat and pressure are applied thereto. At this time, mainly the adhesion layers 131 and 132 melt, but the functional layer 133 does not melt. In addition, the two glass plates 11 and are curved in both the horizontal direction and the vertical direction, when the flat intermediate film 13 is disposed and bonded between the two glass plates 11 and 12, wrinkles may be formed on a peripheral edge portion of the functional layer 133. Therefore, in the present embodiment, studies have been made to prevent wrinkles from being formed on a peripheral edge portion of the functional layer 133, as much as possible.

$r_V$ and $r_H$ are defined in the above definition, which indicate the degree of curvature of the windshield in the axial direction. The larger the values are, the closer to a flat plane the windshield is. In the present embodiment, the above-described flat functional layer 133 is disposed between the two glass plates 11 and 12 that are three-dimensionally curved. However, the functional layer 133 shrinks because heat is applied thereto at the time of manufacture. Therefore, it can be envisaged that, even if such wrinkles are formed, they will be eliminated or reduced through heat shrinkage, depending on the conditions described below. The inventors of the present invention found that, when the degrees of curvature $r_V$ and $r_H$ and the heat shrinkages $r_{MD}$ and $r_{TD}$ were compared with each other, and the degrees of curvature $r_V$ and $r_H$ were larger than the heat shrinkages, almost no wrinkles were formed.

Here, in the present embodiment, the intermediate film 13 is disposed between the two glass plates 11 and 12 so that the MD direction coincides with the longitudinal direction of the windshield, i.e., the horizontal direction. The inventors of the present invention found that wrinkles did not occur when Formula (1) below considering the curvature in both the X axis direction and the Y axis direction was satisfied. That is to say, if the degree of curvature of the windshield is greater than the degree of heat shrinkage of the functional layer 133, the excessive portion of the functional layer that does not follow the curved surface shrinks due to the heat shrinkage of the functional layer 133, and the functional layer 133 follows the curvature, and wrinkles are less likely to be formed.

$$r_V \times r_H \geq r_{MD} \times r_{TD} \tag{1}$$

Also, when the degree of curvature in the lateral direction is small, i.e., when $r_V$ is sufficiently large, wrinkles formed due to the curvature in the lateral direction can be ignored. That is to say, when the intermediate film 13 is disposed between the outer glass plate 11 and the inner glass plate 12, the functional layer 133 is disposed so as to match the curvature in the longitudinal direction, and thus wrinkles are prevented from being formed in the longitudinal direction on the functional layer 133. Also, since the degree of curvature in the lateral direction is small, the influence of wrinkles on the functional layer 133 caused due to the curvature in the lateral direction is small. Therefore, the intermediate film 13 can be disposed between the two glass plates 11 and 12 so that the number of wrinkles formed on the functional layer 133 is reduced, as in the case of wrapping a flat sheet around a columnar object.

Furthermore, when the two glass plates 11 and 12 and the intermediate film 13 are bonded together, if the functional layer 133 satisfies $r_V \geq r_{TD}$, the excessive portion of the functional layer in the lateral direction shrinks due to the heat shrinkage of the functional layer 133 so as to follow the curvature. As a result, it is possible to dispose the functional layer 133 while preventing wrinkles from being formed. From the above, the inventors of the present invention found that, when the intermediate film 13 was to be bonded, if Formula (2) was satisfied, wrinkles were not formed or only negligible wrinkles were formed.

$$r_V \geq 0.9990 \text{ and } r_V \geq r_{TD} \tag{2}$$

As described above, in order to prevent wrinkles from being formed on the functional layer 133, it is preferable to form the laminated glass 10 so as to satisfy at least one of Formulas (1) and (2), and when both Formulas (1) and (2) are satisfied, it is possible to further prevent wrinkles from being formed.

<4. Method for Manufacturing Windshield>

Next, an example of a method for manufacturing a windshield with the above-described configuration will be described. First, a method for manufacturing a laminated glass 1 will be described.

First, at least one of the outer glass plate 11 and the inner glass plate 12 that have a flat plate shape, and the above-described obstructing layer 4 are laminated. Next, shape forming is performed so that the glass plates 11 and 12 are curved. The shape forming method is not particularly limited, and a known method may be adopted. For example, after the flat glass plates have passed through a heating furnace, by pressing the glass plates using an upper mold and a lower mold, it is possible to form the glass plates into a curved shape. Alternatively, the flat outer glass plate and inner glass plate are placed on each other, are positioned on a frame-shaped mold, and are passed through a heating furnace. As a result, the two glass plates are softened, and are formed into a curved shape due to their own weight.

When the outer glass plate 11 and the inner glass plate 12 are formed in a curved shape in this way, the intermediate film 13 is subsequently sandwiched between the outer glass plate 11 and the inner glass plate 12, and they are placed in a rubber bag, and pre-bonded to each other at approximately 70° C. to 110° C. while performing suction under reduced pressure. The intermediate film 13 is, for example, the functional layer 133 sandwiched by the adhesion layers 131 and 132. Other pre-bonding methods may also be employed. For example, the intermediate film 13 is sandwiched between the outer glass plate 11 and the inner glass plate 12, and they are heated at 45° C. to 65° C. in an oven. Subsequently, this laminated glass is pressed using a roll at 0.45 MPa to 0.55 MPa. Next, the laminated glass is heated again in the oven at 80° C. to 105° C., and is thereafter pressed again using a roll at 0.45 MPa to 0.55 MPa. In this way, pre-bonding is complete.

Next, main bonding is performed. The pre-bonded laminated glass is subjected to main bonding, using an autoclave at 8 atm to 15 atm at 100° C. to 150° C., for example. Specifically, main bonding can be performed at 14 atm at 145° C., for example. Thus, the laminated glass 1 according to the present embodiment is manufactured.

<5. Features>

With the above-described windshield, the following effects can be achieved.

(1) If a flat intermediate film 13 is sandwiched between two curved glass plates 11 and 12, wrinkles may be formed on a peripheral edge portion of the functional layer 133 in the intermediate film 13. However, the peripheral edge portion of the functional layer 133 is hidden by the obstructing layer 4, and therefore wrinkles, if formed, are prevented from being seen from the inside or the outside of the vehicle. Thus, it is possible to improve the appearance of the windshield.

(2) The outer edge of the functional layer 133 is located inward of an end edge of the laminated glass 10 so as not to be exposed to the outside from the two glass plates 11 and 12. Therefore, at the end edge of the laminated glass 10, the portion exposed from the two glass plates 11 and 12 is protected by the adhesion layers 131 and 132, and water ingress is prevented.

(3) By satisfying at least one of the above Formulas (1) and (2), it is possible to prevent wrinkles from being formed.

<6. Modifications>

Although one embodiment of the present invention is described above, the present invention is not limited to the above embodiment, and can be modified in various manners without departing from the spirit thereof. Note that the following modifications can be combined as appropriate.

<6-1>

In the above embodiment, the entire outer edge portion of the functional layer 133 is located inward of the inner edge of the obstructing layer 4. However, there is a case in which wrinkles are not formed on the entire outer edge portion of the functional layer 133. Therefore, instead of the entire outer edge portion of the functional layer 133, a portion thereof may be located outward of the inner edge of the obstructing layer 4. However, it is preferable that a portion that faces the upper side of the laminated glass 10, of the functional layer 133, is located outward of the inner edge of the obstructing layer 4. This is because rainwater may enter from the upper side of the laminated glass 10, and it is preferable that this portion is hidden by the obstructing layer 4.

Figure 6:
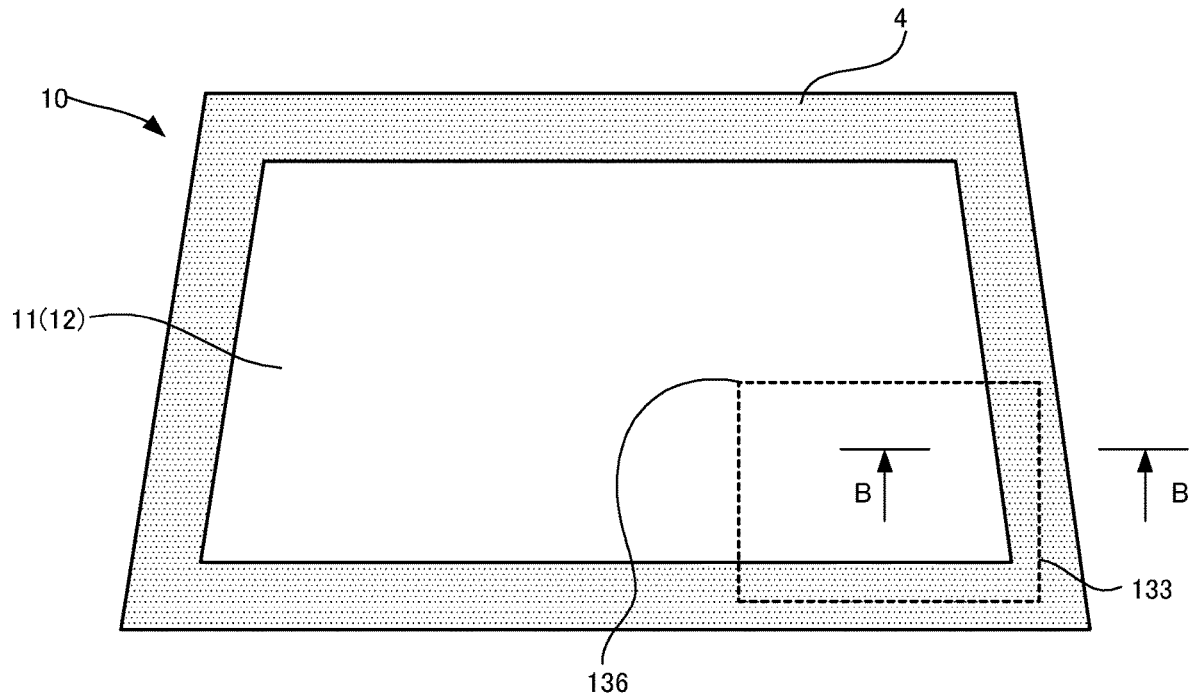
FIG. 6 is a plan view showing another example of the laminated glass according to the present invention.

Furthermore, for example, when a projection film for an HUD is used as the functional layer, a projection film 133 may be provided at the lower end of the laminated glass as shown in FIG. 6. In this case, the projection film 133 is formed into a rectangular shape. Therefore, it is possible to hide the right side and the lower side of the projection film 133 with the obstructing layer 4. Also, the portion exposed from the obstructing layer 4 can be made difficult to see by forming a corner portion 136 at which the upper side and the lower side intersect into an arc shape.

When the projection film 133 is used, in order to make the information projected from the HUD easier to see, it is preferable to set the visible light transmittance of the inner glass plate 12 defined by JIS R3106:1998, for example, to be larger than the visible light transmittance of the outer glass plate 11. In addition, it is possible to make the visible light transmittance per unit thickness of the inner glass plate larger than the visible light transmittance per unit thickness of the outer glass plate 11. It is also preferable that the thickness of the inner glass plate 12 is smaller than the thickness of the outer glass plate 11. The visible light transmittance of the inner glass plate 12 is preferably no less than 85%, for example.

In addition, the projection film 133 is preferably disposed on the inner glass plate 12 side in the thickness direction of the intermediate film 13. That is to say, the second adhesion layer 132 is to be thinner than the first adhesion layer 131. As a result, the optical path from the HUD is reduced, and a double image is less likely to occur. In this case, the distance between the projection film 133 and the inner glass plate 12, i.e., the thickness of the second adhesion layer 132 is preferably 0.3 μm to 100 μm, and more preferably 5 μm to 100 μm. When the second adhesion layer 132 is to be thinned, the inner glass plate 12 side surface of the projection film 133 may be coated with, for example, a material constituting the second adhesion layer 132, such as PVB. As a result, the thickness of the second adhesion layer 132, i.e., the distance between the projection film 133 and the inner glass plate 12, can be set to approximately 0.3 μm.

Figure 7:
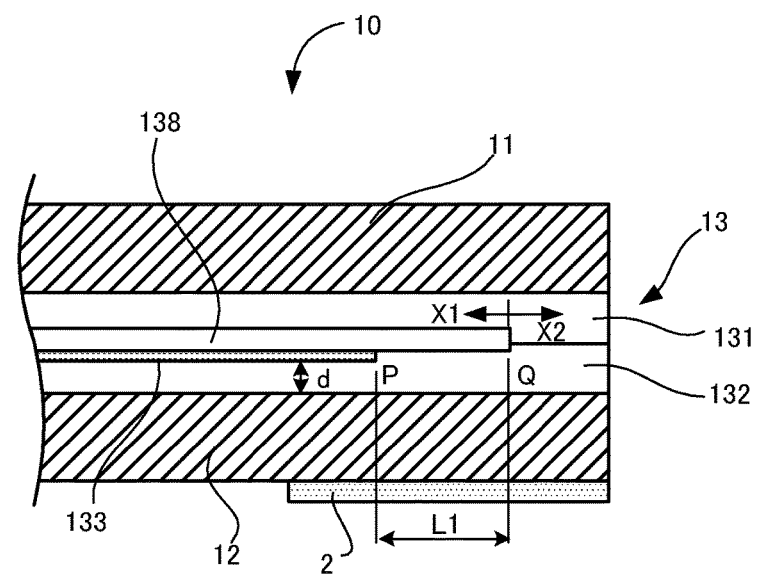
FIG. 7 is a cross-sectional view along a line B-B in FIG. 6.

The projection film 133 can be used alone as a functional layer. However, for example, as shown in FIG. 7, the projection film 133 may be disposed on a base film 138, and these films may be disposed between the two adhesion layers 131 and 132. In this example, the projection film 133 is formed so as to be smaller than the base film 138.

If a functional layer that includes the projection film 133 and the base film 138 described above is disposed in the laminated glass 10, a step may be formed in the intermediate film 13 due to the presence of the outer edge portion of the functional layer 133. As a result, the laminated glass 10 may bulge in the thickness direction, and a double image larger than a reference size may be formed. In particular, the inventors of the present invention confirmed that the laminated glass is distorted in a predetermined range in the planar direction from the outer edge of the functional layer, i.e., the outer edge of the base film, and such a distortion causes a double image larger than a reference size. Note that, as shown in FIG. 7, a double image is formed in both the range from the outer edge of the functional layer 133, i.e., an outer edge Q of the base film 138 to the laminated glass's edge side (X2 side), and the range to the base film side (X1 side), which is the opposite side. Therefore, it is preferable that the projection film 133 to which light is projected from the HUD is separated from the outer edge of the base film 138 so that a double image larger than the reference size is not formed. That is to say, through Test 2 described below, it has been confirmed that a distance L1 between the outer edge of the projection film 133 and the outer edge of the base film is preferably no less than 10 mm, and regarding an image reflected on the projection film, such a configuration prevents a double image from being formed.

In particular, through the Test 1 below, the inventors of the present invention have confirmed that, when a distance d between the functional layer (projection film 133) and the inner glass plate 12 is no greater than 50 µm, a double image can be prevented from being formed on the projection film 133 by setting the distance L1 to be no less than 26.8 mm. Note that, when the distance d between the functional layer 133 and the inner glass plate 12 is no greater than 30 µm, and furthermore, when the distance d is no greater than 25 µm, it is particularly preferable that the distance L1 is no less than 26.8 mm. Note that the distance verified in the above description is based on the above-mentioned knowledge regarding the double image formed on the X1 side, but it has also been confirmed by the inventors that the same applies to the double image formed on the X2 side, i.e., in the direction away from the functional layer 133.

The following describes Test 1. Specifically, as schematically shown in FIG. 7, the first adhesion layer 131, the projection film 133 with a thickness of 101 µm, and the second adhesion layer 132 were disposed between the outer glass plate 1 and the inner glass plate 2 with a side of 300 mm and a thickness of 2 mm, so as to be laminated in the stated order. Here, the thickness of the intermediate film 13 was 0.76 mm, and the distance from the projection film 133 to the inner glass plate 12 (approximately the thickness of the second adhesion layer 132) was 25 µm. The projection film 133 has a size of 252 mm×268 mm, which is smaller than the base film 138, and the distance L1 is secured between the outer edge of the base film 138 and the outer edge of projection film 133. In such a laminated glass, a double image measurement conforming to JIS R3211/R3212 was performed while changing the position of the projection film 133 on the base film 138 and changing the distance L1. Specifically, a double image was measured at the outer edge P of the projection film 133 when the distances L1 were 21 mm, 71 mm, and 121 mm. The results are shown in FIG. 8.

Figure 8:
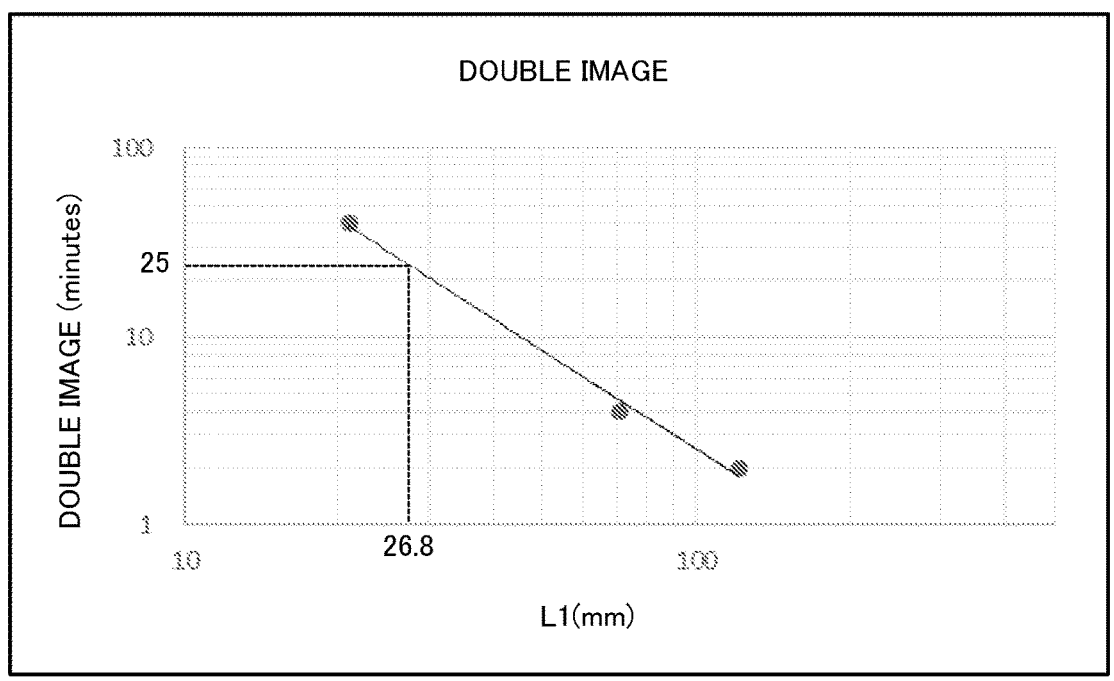
FIG. 8 is a logarithmic graph showing a relationship between a distance L1 and a double image.

FIG. 8 is a logarithmic graph showing three measurement points and an approximate curve thereof. It was found that a distance L1 that conforms to the reference value defined in the JIS described above, i.e., a distance L1 at which the double image was considered to be no greater than 25 minutes, was 26.8 mm. That is to say, it was found that when the distance L1 from the outer edge of the base film 138 to the outer edge of the projection film 133 is no less than 26.8 mm, a double image larger than the reference value would not be formed on the projection film 133.

Furthermore, Test 2 described below was also conducted. Through this Test 2, on a laminated glass on which three types of projection films 133 shown in Table 2, the position of each projection film 133 was moved, and a double image was measured using the above-described method. The outer glass plate 11 and the inner glass plate 12 had a side of 300 mm and a thickness of 2 mm. The thickness of intermediate film 13 was 0.76 mm. Note that the film 2 shown in Table 2 below is the same as the projection film used in Test 1 above.

TABLE 2

|  | Film 1 | Film 2 | Film 3 |
|---|---|---|---|
| Size | 236 mm × 266 mm | 252 mm × 268 mm | 236 mm × 250 mm |
| Thickness | 103 µm | 101 µm | 50 µm |
| Distance L1 from Outer Edge of Base Film to Outer Edge of Projection Film | 25 µm | 25 µm | 380 µm |

As shown in Table 2, the films 1 and 2 are disposed near the inner glass plate in the thickness direction of the intermediate film. On the other hand, the film 3 is disposed near a central position in the thickness direction of the intermediate film. The results of the measurement of a double image are as shown below.

TABLE 3

|  | Distance L1 (mm) from Outer Edge (Upper Side) of Base Film to Projection Film | Distance L1 (mm) from Outer Edge (Right Side) of Base Film to Projection Film | Double Image (minutes) |
|---|---|---|---|
| Film 1 | 18 | 125 | 75 or more |
|  | 68 | 125 | 7 |
|  | 118 | 125 | 0 |
|  | 118 | 75 | 0 |
|  | 118 | 25 | 35 |
| Film 2 | 21 | 133 | 40 |
|  | 71 | 133 | 4 |
|  | 121 | 133 | 2 |
|  | 121 | 83 | 3 |
|  | 121 | 83 | 15 |
| Film 3 | 8 | 125 | 30 |
|  | 10 | 125 | 12 |
|  | 18 | 125 | 1 |
|  | 68 | 125 | 0 |
|  | 118 | 125 | 0 |
|  | 118 | 75 | 0 |
|  | 118 | 25 | 0 |

The reference value of the double image is 25 minutes or less, and therefore, from the results regarding the above films 1 and 2, it was found that, if the projection film 133 was disposed near the inner glass plate 12, a double image larger than the reference value was not formed on the projection film 133 when the distance L1 was no less than 26.8 mm, as with the results shown in FIG. 8. On the other hand, it was found that, if the projection film 133 was disposed near the central position in the thickness direction of the intermediate film 13 as in the case of the film 3, a double image larger than the reference value was not formed on the projection film 133 when the distance L1 was no less than 10 mm.

Figure 9:
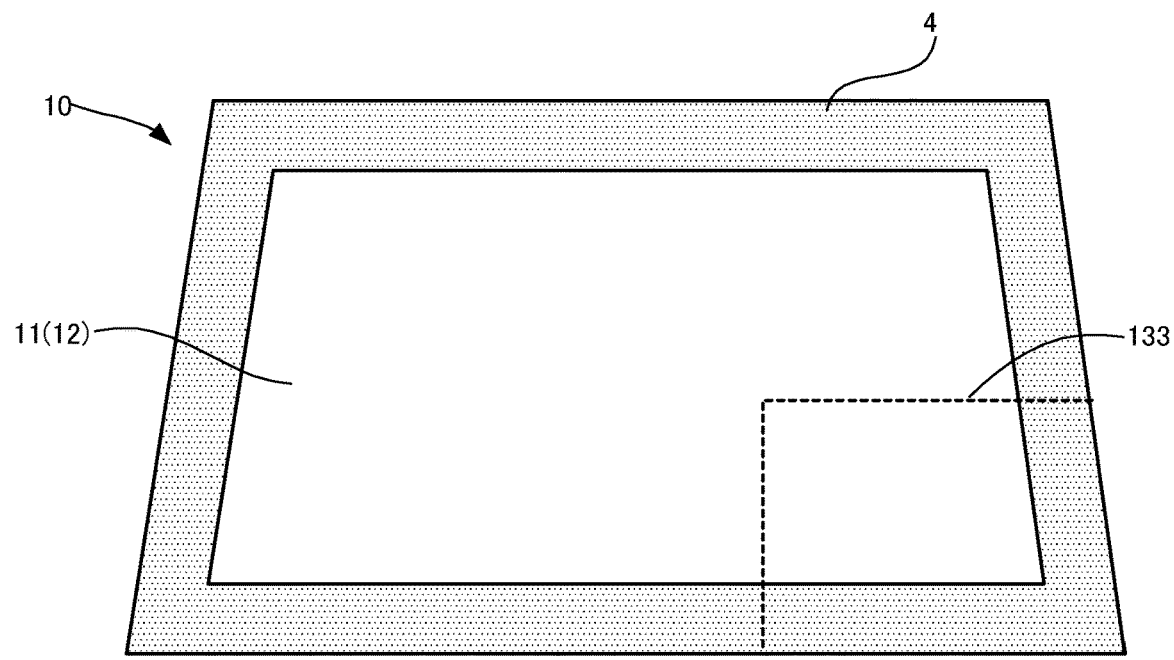
FIG. 9 is a plan view showing another example of the laminated glass according to the present invention.

By the way, in the above-described example in FIG. 6, all sides of the functional layer 13 (the base film 138) are disposed in the laminated glass 10. However, as shown in FIG. 9, it is possible to employ a configuration in which h the outer edge of a portion of the functional layer 13 reaches the end edge of the laminated glass 10. In such a case, the outer edge of the portion of the functional layer 13 is exposed to the outside from a position between the outer glass plate 11 and the inner glass plate 12. With such a configuration, a bulge is less likely to be caused by the above-described step, and a double image can be prevented from being formed on the projection film 133. However, there is the risk of water entering from the exposed end edge of the functional layer 13. In this regard, with the configuration shown in FIG. 6, the outer edge of the functional layer 13 is protected by the adhesion layers 131 and 132 and is not exposed to the outside from a position between the glass plates 11 and 12, and water ingress is prevented. Note that the shapes of the base film 138 and the projection film 133 are not particularly limited, and any shape other than a rectangular shape may be employed.

<6-2>

Figure 10:
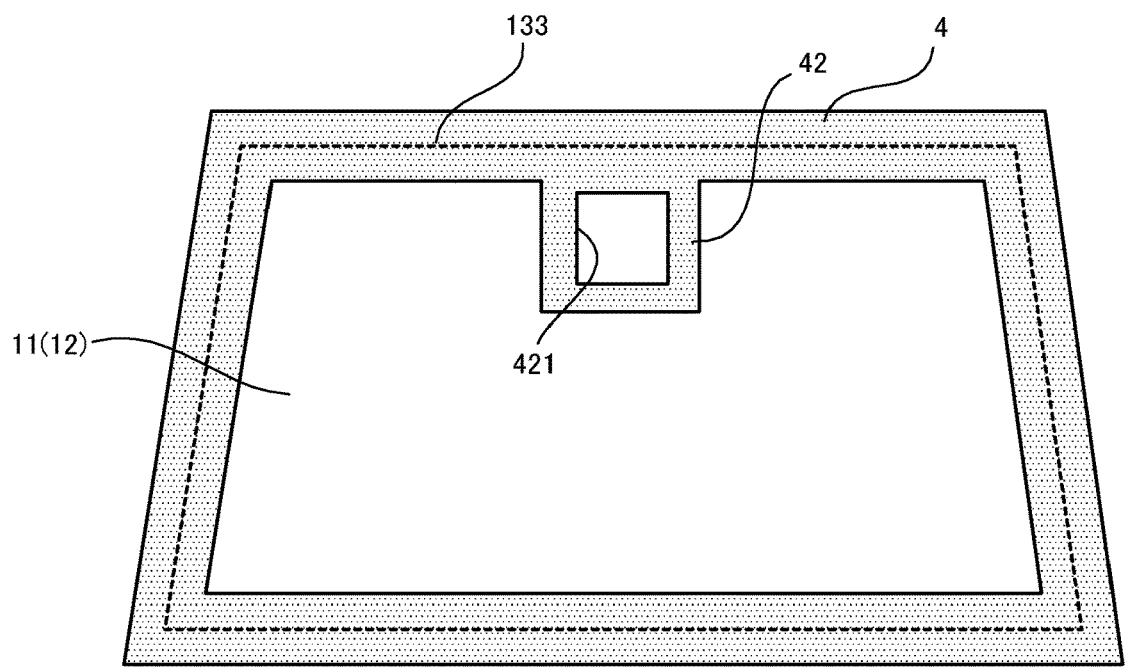
FIG. 10 is a plan view showing another example of the laminated glass according to the present invention.

The configuration of the obstructing layer 4 is not particularly limited, and the obstructing layer 4 may be disposed along the peripheral edge portions of the glass plates as described above. Also, the obstructing layer 4 may be provided with an extension portion 42 for an on-board camera (an information acquisition device) as shown in FIG. 10. This extension portion 42 is provided with an imaging window (opening) 421 for a camera, so that images of the outside of the vehicle can be captured. In addition, it is possible to use this extension portion 42 to make the bracket that supports the camera invisible from the outside of the vehicle. The obstructing layer 4 according to the present invention may be provided with such an extension portion, or formed in various shapes. In addition, the shape of the imaging window 421 is not particularly limited, and may be a shape with a closed peripheral edge as shown in FIG. 9, or a shape in which a portion thereof being open from the end of the extension portion.

For the obstructing layer 4, various materials may be employed in addition to the above-mentioned materials. For example, a material with an infrared transmittance of no greater than 5% may be employed. By using such a material, it is possible to achieve a heat shielding effect at the peripheral edge of the windshield. Further, when a heat shield film is used for the functional layer 133, the heat shield film can be made smaller. That is to say, in the heat shield film, the area of the portion hidden by the obstructing layer 4 can be reduced.

Figure 11:
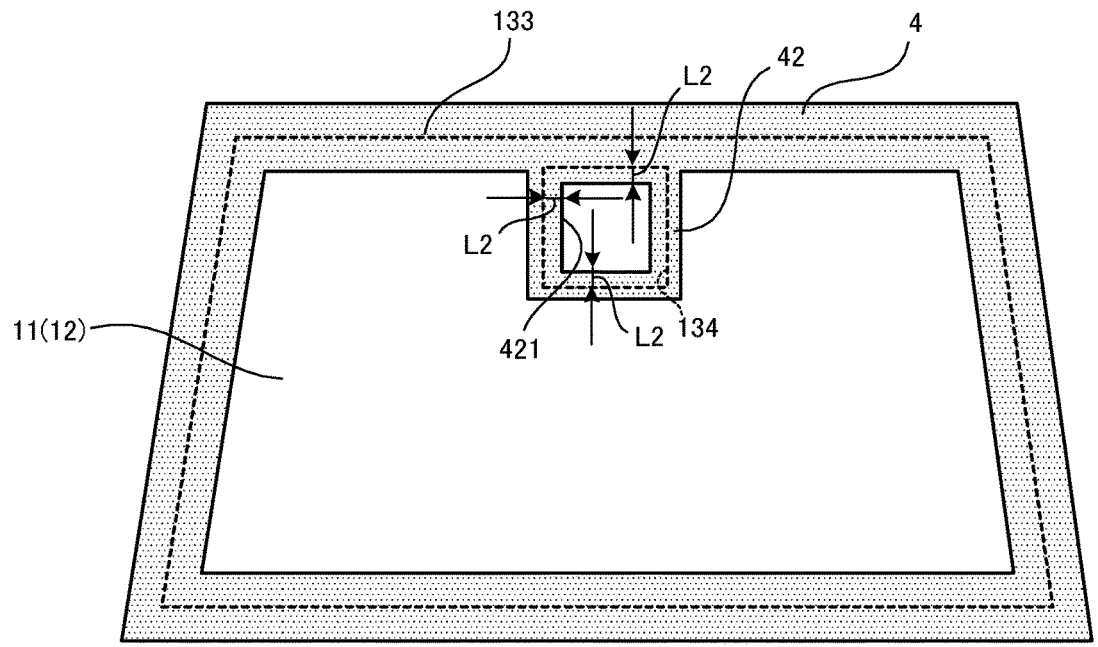
FIG. 11 is a plan view showing another example of the laminated glass according to the present invention.

In addition, in order to prevent the functional layer 133 from affecting imaging performed by the on-board camera, it is preferable that the functional layer 133 is formed so as not to overlap the imaging window 421. For example, as shown in FIG. 11, the a through hole 134 may be formed in a portion that overlaps the imaging window 421 of the functional layer 133. This through hole 134 may be disposed inward of the outer edge of the extension portion 42, and may have a shape that surrounds the imaging window 421. In addition, a distance L2 between the through hole 134 and the imaging window 421 is preferably no less than 10 mm. This is because, as described above, a step is formed in the intermediate film 13 due to the outer edge of the functional layer 133, and a double image is formed in a given range from the outer edge of the functional layer 133 in a planer direction. In this example, the step formed due to the presence of the inner edge of the through hole 134 in the functional layer 133 may generate a double image larger than the reference value, at a position inward of the inner edge (the above-mentioned double image on the X2 side). Therefore, it is preferable that the imaging window 421 is separated from the inner edge of the through hole 134 by at least 10 mm. In particular, when the distance between the functional layer 133 and the outer glass plate 11 or the inner glass plate 12 (the thickness of the first adhesion layer 131 or the second adhesion layer 132) is no greater than 10 μm, it is preferable that the distance L2, calculated in the same manner as the above distance L1, is no less than 26.8 mm.

Figure 12:
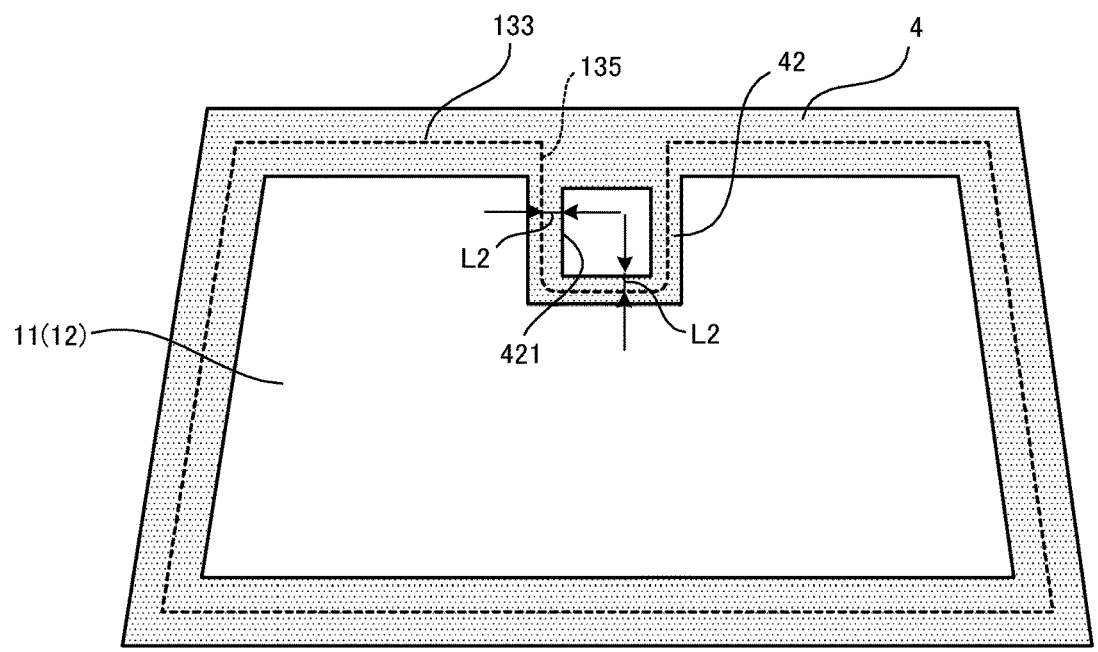
FIG. 12 is a plan view showing another example of the laminated glass according to the present invention.

Also, instead of forming a through hole in the functional layer 133 as described above, a cutout 135 may be formed in the upper edge of the functional layer 133 as shown in FIG. 12. The imaging window 421 may be formed upward of the cutout 135. This cutout 135 may be located inward of the outer edge of the extension portion 42, and may have a shape that passes through the periphery of the imaging window 421. In addition, the distance L2 between the cutout 135 and the imaging window 421 may be set in the same manner as described above.

The above-described imaging window 421 may also be used for various sensors other than the on-board camera.

<6-3>

Although the above embodiment describes an example in which the automobile laminated glass according to the present invention is applied to a windshield, the automobile laminated glass may also be applied to a rear window, a side window, and so on.

EXAMPLES

The following describes examples of the present invention. Note that the present invention is not limited to the following embodiments.

Windshields according to Examples 1 to 15 and Comparative Examples 1 to 4 manufactured using the method described in the above embodiment were prepared. Dimensions and so on are as shown below. Note that the definitions of the dimensions shown below are the same as those shown in the above embodiment.

TABLE 4

| | Vertical Direction | | | | Horizontal Direction | | | |
|---|---|---|---|---|---|---|---|---|
| | Amount of Bend (mm) | Curved Line OP (mm) | Straight Line OP (mm) | $r_V$ (%) | Bending Depth (mm) | Curved Line QR (mm) | Straight Line QR (mm) | $r_H$ (%) |
| Example 1 | 19.7 | 902.35 | 901.16 | 99.87 | 33.9 | 1346.16 | 1343.8 | 99.82 |
| Example 2 | 33.2 | 1058.04 | 1055.2 | 99.73 | 37.6 | 1371.42 | 1368.52 | 99.79 |
| Example 3 | 17.1 | 897 | 896.11 | 99.90 | 58.45 | 1418.05 | 1411 | 99.50 |
| Example 4 | 24.1 | 1266.05 | 1264.64 | 99.89 | 75.48 | 1532.98 | 1520.81 | 99.21 |
| Example 5 | 16.2 | 828.89 | 827.93 | 99.88 | 81.29 | 1517 | 1503.89 | 99.14 |
| Example 6 | 21.0 | 1021.93 | 1020.71 | 99.88 | 87.26 | 1522.01 | 1507.42 | 99.04 |
| Example 7 | 15.8 | 839.56 | 838.77 | 99.91 | 148.24 | 1671.17 | 1630.8 | 97.58 |
| Example 8 | 25.4 | 1119.23 | 1117.49 | 99.84 | 42.6 | 1471.05 | 1467.5 | 99.76 |
| Example 9 | 15.4 | 832.07 | 831.28 | 99.91 | 101.08 | 1449.62 | 1429.1 | 98.58 |

TABLE 4-continued

|  | Vertical Direction | | | | Horizontal Direction | | | |
|---|---|---|---|---|---|---|---|---|
|  | Amount of Bend (mm) | Curved Line OP (mm) | Straight Line OP (mm) | $r_V$ (%) | Bending Depth (mm) | Curved Line QR (mm) | Straight Line QR (mm) | $r_H$ (%) |
| Example 10 | 13.0 | 931.71 | 931.2 | 99.95 | 80.7 | 1547.29 | 1535.95 | 99.27 |
| Example 11 | 21.85 | 1006.18 | 1005.21 | 99.90 | 92.41 | 1464.95 | 1451.5 | 99.08 |
| Example 12 | 21.85 | 1006.18 | 1005.21 | 99.90 | 92.41 | 1464.95 | 1451.5 | 99.08 |
| Example 13 | 21.85 | 1006.18 | 1005.21 | 99.90 | 92.41 | 1464.95 | 1451.5 | 99.08 |
| Example 14 | 21.85 | 1006.18 | 1005.21 | 99.90 | 92.41 | 1464.95 | 1451.5 | 99.08 |
| Example 15 | 21.85 | 1006.18 | 1005.21 | 99.90 | 92.41 | 1464.95 | 1451.5 | 99.08 |
| Comparative Example 1 | 21.9 | 1006.52 | 1005.18 | 99.87 | 92.41 | 1466.77 | 1450.37 | 98.88 |
| Comparative Example 2 | 21.85 | 1006.18 | 1005.21 | 99.90 | 92.41 | 1464.95 | 1451.5 | 99.08 |
| Comparative Example 3 | 22.6 | 932.1 | 930.51 | 99.83 | 128.66 | 1546.18 | 1513.96 | 97.92 |
| Comparative Example 4 | 22.9 | 905.29 | 903.6 | 99.81 | 106.3 | 1337.66 | 1312.95 | 98.15 |
| Comparative Example 5 | 21.4 | 904.94 | 903.53 | 99.84 | 123.78 | 1498.93 | 1465.37 | 97.76 |

All of the intermediate films (materials A to G) used for the windshields according to the above Examples 1 to 15 and Comparative Examples 1 to 4 are the same as described below, and are each constituted by two adhesion layers and a functional layer interposed therebetween.

First Adhesion Layer: Polyvinyl butyral resin (PVB), thickness 380 μm

Second Adhesion Layer: Polyvinyl butyral resin (PVB), thickness 380 μm

Functional Layer: Three types of heat-reflecting films were used as functional layers. The heat shrinkage $r_{MD}$ and $r_{TD}$ of each functional layer in the MD direction and the TD direction are as shown in Table 3 below. The size of the outer edge of each functional layer was adjusted so as to be located at a position that is 10 mm inward of the outer edge of the glass plates. The thickness of each functional layer was 50 μm.

TABLE 5

|  | Material Name | $r_{MD}$ | $r_{TD}$ |
|---|---|---|---|
| Example 1 | A | 99.4% | 99.4% |
| Example 2 | A | 99.4% | 99.4% |
| Example 3 | A | 99.4% | 99.4% |
| Example 4 | A | 99.4% | 99.4% |
| Example 5 | A | 99.4% | 99.4% |
| Example 6 | A | 99.4% | 99.4% |
| Example 7 | A | 99.4% | 99.4% |
| Example 8 | A | 99.4% | 99.4% |
| Example 9 | A | 99.4% | 99.4% |
| Example 10 | A | 99.4% | 99.4% |
| Example 11 | B | 99.0% | 98.7% |
| Example 12 | D | 97.9% | 98.5% |
| Example 13 | E | 98.9% | 96.6% |
| Example 14 | F | 97.2% | 97.7% |
| Example 15 | G | 99.5% | 99.6% |
| Comparative Example 1 | A | 99.4% | 99.4% |
| Comparative Example 2 | C | 100.0% | 99.8% |
| Comparative Example 3 | A | 99.4% | 99.4% |
| Comparative Example 4 | A | 99.4% | 99.4% |

Regarding Examples 1 to 15 and Comparative Examples 1 to 4, the above-described Formulas (1) and (2) were examined, and the presence or absence of wrinkles on the peripheral edge portion of the functional layer was visually observed. The results are as shown below.

TABLE 6

|  | Formula (1) | Formula (2) | | Wrinkles |
|---|---|---|---|---|
|  | $r_V \times r_H \geq r_{MD} \times r_{TD}$ | $r_V \geq 0.9990$ | $r_V \geq r_{TD}$ |  |
| Example 1 | YES | NO | YES | Absent |
| Example 2 | YES | NO | YES | Absent |
| Example 3 | YES | YES | YES | Absent |
| Example 4 | YES | NO | YES | Absent |
| Example 5 | YES | NO | YES | Absent |
| Example 6 | YES | NO | YES | Absent |
| Example 7 | NO | YES | YES | Absent |
| Example 8 | YES | NO | YES | Absent |
| Example 9 | NO | YES | YES | Absent |
| Example 10 | YES | YES | YES | Absent |
| Example 11 | YES | YES | YES | Absent |
| Example 12 | YES | YES | YES | Absent |
| Example 13 | YES | YES | YES | Absent |
| Example 14 | YES | YES | YES | Absent |
| Example 15 | YES | NO | YES | Absent |
| Comparative Example 1 | NO | NO | YES | Present |
| Comparative Example 2 | NO | YES | NO | Present |
| Comparative Example 3 | NO | NO | YES | Present |
| Comparative Example 4 | NO | NO | YES | Present |
| Comparative Example 5 | NO | NO | YES | Present |

As shown in Table 6, Examples 1 to 11 satisfied at least one of Formulas (1) and (2), and as a result, wrinkles were not formed on the peripheral edge portion of the functional layer. In contrast, Comparative Examples 1 to 4 did not satisfy Formulas (1) or (2), and as a result, wrinkles were formed on the peripheral edge portion of the functional layer.

LIST OF REFERENCE NUMERALS

10 Laminated Glass
11 Outer Glass Plate (First Glass Plate)
12 Inner Glass Plate (Second Glass Plate)
13 Intermediate Film
131 First Adhesion Layer
132 Second Adhesion Layer
133 Functional Layer
4 Obstructing Layer

The invention claimed is:

1. An automobile laminated glass comprising:
   a first glass plate that is formed into a rectangular shape;
   a second glass plate that is disposed so as to face the first glass plate, and is formed into a rectangular shape;
   an intermediate film that is disposed between the first glass plate and the second glass plate, and includes a functional layer; and
   an obstructing layer that is laminated on a peripheral edge portion of at least one of the first glass plate and the second glass plate,
   wherein the functional layer is formed so that an outer edge of at least a portion of the functional layer is located outward of an inner edge of the obstructing layer and the functional layer is configured to thermally shrink when heated at 130° C. for 30 minutes.

2. The automobile laminated glass according to claim 1, wherein the functional layer includes a projection film for a head-up display device, and at least one base film that supports the projection film, and
   a portion of the outer edge of the functional layer is formed so as to reach an end edge of the automobile laminated glass.

3. The automobile laminated glass according to claim 1, wherein the functional layer includes a projection film for a head-up display device, and at least one base film that supports the projection film, and
   a portion of the outer edge of the functional layer is disposed with a gap from an end edge of the automobile laminated glass.

4. The automobile laminated glass according to claim 1, wherein the functional layer includes a projection film for a head-up display device, and at least one base film that supports the projection film, and
   an end edge of the projection film is located inward of an end edge of the base film, with a gap of at least 10 mm from the end edge of the base film.

5. The automobile laminated glass according to claim 1, wherein the second glass plate is located on a vehicle interior-side,
   the functional layer includes a projection film and at least one base film that supports the projection film, and
   when a distance between the base film and the second glass plate is no greater than 50 µm, an end edge of the projection film is located inward of an end edge of the base film, with a gap of at least 26.8 mm from the end edge of the base film.

6. The automobile laminated glass according to claim 1, wherein the second glass plate is located on a vehicle interior-side,
   the functional layer includes a projection film for a head-up display device, and
   a visible light transmittance of the second glass plate is greater than a visible light transmittance of the first glass plate.

7. The automobile laminated glass according to claim 1, wherein the second glass plate is located on a vehicle interior-side,
   the functional layer includes a projection film for a head-up display device, and
   a distance between the projection film and the second glass plate is smaller than a distance between the projection film and the first glass plate.

8. The automobile laminated glass according to claim 1, wherein the obstructing layer is provided with an opening through which light entering an information acquisition device that is provided on a vehicle interior-side passes, and
   a distance between the opening and the functional layer is no less than 10 mm.

9. The automobile laminated glass according to claim 8, wherein a distance between the functional layer and either one of the glass plates is no greater than 50 µm, and
   a distance between the opening and the functional layer is no less than 26.8 mm.

10. The automobile laminated glass according to claim 8, wherein the functional layer is provided with an projection film for a head-up display device, and
    an upper edge of the projection film is located lower than the opening.

11. The automobile laminated glass according to claim 1, wherein the functional layer is provided with an infrared reflective film, and
    a distance between the infrared reflective film and the first glass plate is smaller than a distance between the infrared reflective film and the first glass plate.

12. The automobile laminated glass according to claim 1, wherein the intermediate film is provided with
    the functional layer, and
    at least one adhesion layer for bonding the functional layer to at least one of the glass plates.

13. The automobile laminated glass according to claim 1, wherein the functional layer is formed so that an outer edge of at least a portion of the functional layer is located within a range of 10 mm inward of an outer edge of the automobile laminated glass.

14. The automobile laminated glass according to claim 1, wherein the automobile laminated glass is curved so as to protrude toward the first glass plate side, and
    a maximum distance between a virtual line connecting respective midpoints of upper and lower sides of the second glass plate and the second glass plate is no less than 10 mm.

15. The automobile laminated glass according to claim 1, wherein the automobile laminated glass is curved so as to protrude toward the first glass plate side, and
    at least one of Formulas (1) and (2) below is satisfied:

$$r_V \times r_H \geq r_{MD} \times r_{TD} \tag{1}$$

$$r_V \geq 0.9990 \text{ and } r_V \geq r_{TD} \tag{2}$$

where
O denotes a midpoint of an upper side of the second glass plate,
P denotes a midpoint of a lower side of the second glass plate,
Q denotes a midpoint of a left side of the second glass plate,
R denotes a midpoint of a right side of the second glass plate,
$L_V$ denotes a length of a curved line OP that extends along a first surface of the second glass plate on an opposite side of the first glass plate,
$I_V$ denotes a length of a straight line OP,
Lh denotes a length of a curved line QR extending along the first surface of the second glass plate,
$I_H$ denotes a length of a straight line QR,
rV denotes $I_V/L_V$,
$r_H$ denotes $I_H/L_H$, an MD direction denotes a roll winding direction in which the functional layer is fed out, a TD direction denotes a direction that is orthogonal to the roll winding direction in which the functional layer is fed out, $r_{MD}$ denotes a heat shrinkage of the functional layer in the MD direction before and after being heated at 130° C. for 30 minutes, $r_{TD}$ denote a heat shrinkage of the functional layer in the TD direction before and after being heated at 130° C. for 30 minutes, and the MD direction of the functional layer coincides with a direction in which the curved line QR extends.

16. The automobile laminated glass according to claim 1, wherein the first glass plate is located on a vehicle exterior-side, the second glass plate is located on a vehicle interior-side, and the obstructing layer is laminated on at least one of a vehicle interior-side surface of the first glass plate and a vehicle interior-side surface of the second glass plate.

17. The automobile laminated glass according to claim 1, wherein the functional layer includes a heat shield film.

18. The automobile laminated glass according to claim 1, wherein the functional layer includes at least one of a heating element or an antenna element.

19. The automobile laminated glass according to claim 1, wherein the automobile laminated glass is configured so that light emitted from a head-up display device projects information thereto, and the functional layer includes a projection film to which the information is projected.

* * * * *